United States Patent
Bertoni et al.

(10) Patent No.: US 6,295,598 B1
(45) Date of Patent: Sep. 25, 2001

(54) SPLIT DIRECTORY-BASED CACHE COHERENCY TECHNIQUE FOR A MULTI-PROCESSOR COMPUTER SYSTEM

(75) Inventors: Jonathan L. Bertoni, Colorado Springs; Lee A. Burton, Divide, both of CO (US)

(73) Assignee: SRC Computers, Inc., Colorado Springs, CO (US)

( * ) Notice: Subject to any disclaimer, the term of this patent is extended or adjusted under 35 U.S.C. 154(b) by 0 days.

(21) Appl. No.: 09/108,088

(22) Filed: Jun. 30, 1998

(51) Int. Cl.[7] .................................................. G06F 9/30
(52) U.S. Cl. .................................. 712/28; 712/23; 712/32
(58) Field of Search ............................................ 712/23–32

(56) References Cited

U.S. PATENT DOCUMENTS

| | | | |
|---|---|---|---|
| 5,058,006 | * 10/1991 | Durdan et al. ........................ | 711/122 |
| 5,191,652 | 3/1993 | Dias et al. . | |
| 5,197,146 | * 3/1993 | LaFetra ................................ | 711/144 |
| 5,265,232 | * 11/1993 | Gannon et al. ....................... | 711/124 |
| 5,297,269 | * 3/1994 | Donaldson et al. .................. | 711/145 |
| 5,530,832 | * 6/1996 | So et al. ............................... | 711/122 |
| 5,592,625 | 1/1997 | Sandberg . | |
| 5,680,576 | * 10/1997 | Laudon ................................ | 711/145 |
| 5,787,476 | * 7/1998 | Laudon et al. ....................... | 711/141 |
| 5,829,035 | * 10/1998 | James et al. ......................... | 711/141 |
| 5,897,656 | * 4/1999 | Vogt et al. ............................ | 711/141 |
| 5,900,015 | * 5/1999 | Herger et al. ........................ | 711/141 |

\* cited by examiner

*Primary Examiner*—Richard Hjerpe
*Assistant Examiner*—Mackly Monestime
(74) *Attorney, Agent, or Firm*—William J. Kubida; Stuart T. Langley; Hogan & Hartson LLP (57) ABSTRACT

A split directory-based cache coherency technique utilizes a secondary directory in memory to implement a bit mask used to indicate when more than one processor cache in a multi-processor computer system contains the same line of memory which thereby reduces the searches required to perform the coherency operations and the overall size of the memory needed to support the coherency system. The technique includes the attachment of a "coherency tag" to a line of memory so that its status can be tracked without having to read each processor's cache to see if the line of memory is contained within that cache. In this manner, only relatively short cache coherency commands need be transmitted across the communication network (which may comprise a Sebring ring) instead of across the main data path bus thus freeing the main bus from being slowed down by cache coherency data transmissions while removing the bandwidth limitations inherent in other cache coherency techniques. The technique disclosed may be further expanded to incorporate the "bus lock" capability of bus-based systems compatible with the requirements for multi-processor synchronization.

22 Claims, 7 Drawing Sheets

SPLIT DIRECTORY-BASED CACHE COHERENCY TECHNIQUE FOR A MULTI-PROCESSOR COMPUTER SYSTEM

CROSS REFERENCE TO RELATED PATENT APPLICATIONS

The present invention is related to the subject matter disclosed in U.S. patent applications Ser. No. 08/992,763 filed Dec. 17, 1997 for "Multiprocessor Computer Architecture Incorporating a Plurality of Memory Algorithm Processors in the Memory Subsystem"; U.S. Ser. No. 09/008,871 filed Jan. 20, 1998 for "Scalable Single System Image Operating Software Architecture for a Multi-Processing Computer System"; and U.S. Ser. No. 09/018,032 filed Feb. 3, 1998 for "System and Method for Dynamic Priority Conflict Resolution in a Multi-Processor Computer System Having Shared Memory Resources" all assigned to SRC Computers, Inc., Colorado Springs, Colo., assignee of the present invention, the disclosures of which are herein specifically incorporated by this reference.

BACKGROUND OF THE INVENTION

The present invention relates, in general, to the field of multi-processor computer systems. In particular, the present invention relates to a split directory-based cache coherency technique for a multi-processor computer system.

The advent of low-cost high-performance microprocessors has made large-scale multiprocessor computers feasible. In general, these microprocessors are cache-oriented; that is, they maintain a subset of the contents of main memory in high-speed storage close to the processor to improve the access latency and bandwidth of frequently-used memory data. This local memory can become inconsistent if one processor changes an element of memory by modifying its local cache and then the change is not propagated to all processors that share that memory. The precise structure of such caches varies greatly depending on the system design.

This caching problem has led to two basic architectures sometimes known as "shared memory" and "partitioned memory". In a shared memory system, algorithms are used to maintain the consistency of the shared data. Typically, in commercially successful systems, the consistency is implemented by hardware and is invisible to the software. Such systems are called "cache-consistent" and form the basis of almost all multiprocessor computer systems produced. On the other hand, the partitioned memory approach disallows sharing of memory altogether or allows sharing by only a small number of processors, thereby simplifying the problem greatly. In such computer systems, larger configurations are created by connecting groups of computer systems with a network and using a message-passing paradigm that is most often made visible to the application software running on the system.

The development of cache coherent systems has led to some fundamental design problems. For large-scale systems, the data transmission and speed limitations make cache coherency difficult to achieve successfully. Coherency operations transmitted across the communications channel have traditionally been limited by low bandwidths, thus reducing overall system speed. Large-scale systems containing a high number of processors require accurate and high-speed cache coherency implementations.

With this in mind, some fundamental issues must be resolved in order to maintain a consistent view of memory across processors. First, processors must follow an arbitration protocol that grants permission to a processor to read or modify memory contents. To perform this function, coherency protocols divide memory into fixed "lines", (subsections of memory, typically 32, 64, or 128 bytes in size) that are treated as an atomic unit. Typically, each line is allocated to a single processor in "exclusive mode", which allows writing, to one or more processors in "read-only mode", or that line is currently not cached. A processor is required to request a line in exclusive or read-only mode when loading it from the memory. In order to support this, the cache must allow the memory subsystem to delay completion of a request while the state of the line is analyzed and operations are performed on the processor cache while the system is waiting for an operation to complete.

The process of moving a line from one processor to another, when that is required, can be done in many ways. One of these approaches is termed "invalidation based" and is the technique most frequently used in existing multi-processor computer systems. In such systems, lines are removed from other processors' caches when the contents of a line are to be changed. Another approach allows for updating all caches containing the line when that line is changed.

The most common method of providing cache coherence is by using a "snoopy bus" approach. In such systems, all processors can monitor all memory transactions because they are all performed over a small number of buses, usually one or two. This approach cannot be used for large-scale systems because buses cannot supply the required data bandwidth from memory to the processors.

In such cases, most commonly a "directory" approach is used. Such systems use a database to record the processors to which lines are allocated. Transactions on memory require that the directory be examined to determine what coherency operations are required to allocate the line in question. The method of keeping the directory varies.

Many schemes have been proposed to record the contents of the directory. Most either require time-expensive searches when a directory inquiry is made or use broadcasting when the precise set of caches containing the line is too large to be recorded in the directory hardware. "Broadcasting", in this context, means sending a message to all processors in the system, often by the use of special hardware features to support this style of communication. The difficulty with broadcasting is that switch-based networks do not easily support such operations, and the cost of interrupting processors with requests that do not involve their cache contents can be high.

In order to invalidate a line that is to be updated, all caches that contain the line must be contacted, which requires a decision as to which processors to contact. Once a list of processors that have allocated the line has been made from the directory, each processor must be sent a message instructing it to remove the line from the cache and to send any changes to the memory. This operation must be supported by the microprocessor cache hardware.

SUMMARY OF THE INVENTION

In order to provide processors with a cache-coherent view of shared memory resources, all of the processors in a multi-processor computer system must view all memory changes in a useful, predefined order. For the class of microprocessors disclosed in a preferred embodiment described in greater detail hereinafter (e.g. the Deschutes™ microprocessor developed by Intel Corporation, Santa Clara, Calif.), the coherency model is called "total store order". This means that all memory changes made by a given processor are visible in the order in which they are made by that particular processor and are visible in that order to all processors in the system. Likewise, read operations do not cross conflicting write operations.

Nevertheless, the cache coherency technique disclosed herein is not limited to this particular coherency model and, in fact, can support all current models through the connection of memory to the processors with a cache communication network.

However, since the processors cannot view all transactions in such a system, the present invention contemplates the inclusion of reasonable-cost, complete directories with low-complexity directory lookup. This approach can be extended to allow even smaller directories with some broadcasting if desired, for a given application.

In order to provide coherency, the technique of the present invention requires extra data storage associated with each line of memory (a "coherency tag") to hold parts of the directory. In addition, a secondary directory area is used for each memory controller. This secondary directory consists of entries that are used for widely-shared lines. In the embodiment disclosed, it is assumed that each such entry contains a bit for every processor on the system, which bit indicates whether that processor holds the line in question. In addition to the bit mask, in certain applications it may be desirable to keep a count of the number of bits that are set in the mask.

What is disclosed herein is a split directory-based cache coherency technique which utilizes a secondary directory in memory to implement a bit mask used to indicate when more than one processor cache in a multi-processor computer system contains the same line of memory. This technique thereby reduces the search complexity required to perform the coherency operations and the overall size of the memory needed to support the coherency system. The technique includes the attachment of a "coherency tag" to a line of memory so that its status can be tracked without having to read each processor's cache to see if the line of memory is contained within that cache. The technique disclosed may be further expanded to incorporate the "bus lock" capability of bus-based systems compatible with the requirements for multi-processor synchronization.

Particularly disclosed herein is a multi-processor computer system which comprises a plurality of processors, each having an associated data cache. The system further includes main memory and a communication network bidirectionally coupling the plurality of processors with the main memory to enable communication of data therebetween. The main memory comprises at least one directory having a number of entries therein, each of the entries containing a bit location for each of the plurality of processors in the computer system.

Further disclosed herein is a method for maintaining cache coherency in a multi-processor computer system which includes a main memory and wherein each of a plurality of processors has an associated data cache. The method comprises the steps of providing a communication network coupling the plurality of processors to the main memory; also providing at least one directory in the main memory having a number of entries therein and designating a bit location in the directory for each of the plurality of processors in the computer system.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1A:
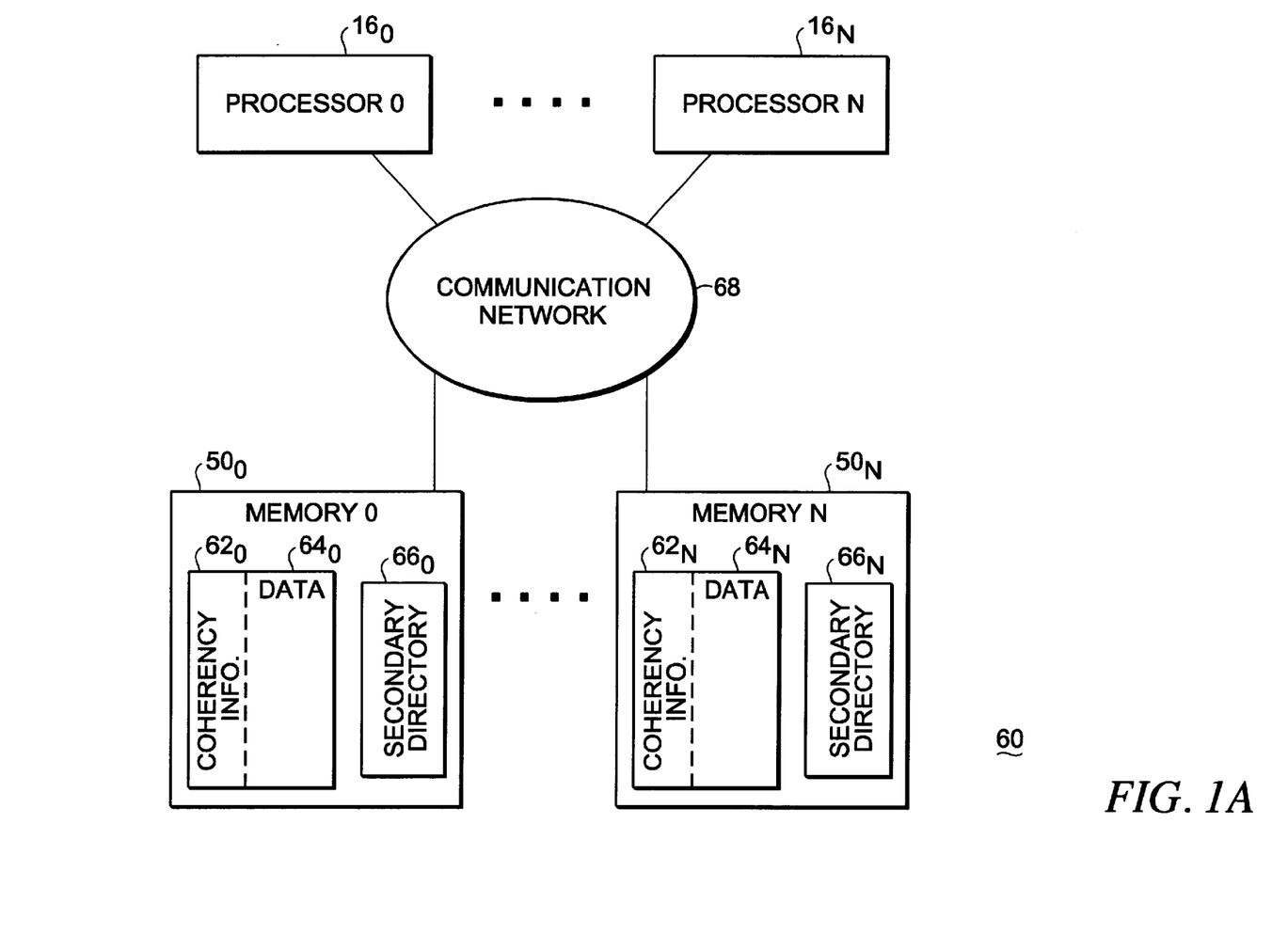
FIG. 1A is a functional block diagram of an exemplary multi-processor computer system implementing the cache coherency technique of the present invention.

With reference now to FIG. 1A, a representative computer system 60 architecture for possible implementation of the split directory-based cache coherency technique of the present invention is shown. It should be noted that the interconnections shown in the representative embodiment illustrated can be provided in a wide variety of alternative implementations as the cache coherency technique disclosed is not ultimately dependent on how communications between the various system elements are implemented.

The particular computer system 60 shown includes a plurality of processors $16_0$ through $16_N$ which are interconnected to a plurality of memory banks $50_0$ through $50_N$ (comprising a shared memory resource, or system main memory) through a communication network 68, comprising single or multiple communications resources, as will be more fully described hereinafter. The processors $16_0$ through $16_N$ are also interconnected to the memory banks $50_0$ through $50_N$ by means of an interconnect switch 70 comprising a number of memory switches $52_0$ through $52_N$, processor switches $54_0$ through $54_N$ and interconnecting trunk lines $14_0$ through $14_N$ as described and shown with respect to the preceding FIG. 2. Each memory bank $50_0$ through $50_N$ includes portions $62_0$ through $62_N$ containing coherency information corresponding to data portions $64_0$ through $64_N$ as well as a secondary directory $66_0$ through $66_N$ respectively.

As an example only, the hypothetical computer system 60 may contain sixteen processors $16_0$ through $16_{15}$ and sixteen memory banks (or units) $50_0$ through $50_{15}$ interleaved at the line level to form a global main memory or shared memory resources. It should be noted that the cache coherency technique disclosed herein can be applied to any number of processors and any number of memory units of any size. The cache associated with each processor 16 in the exemplary computer system 60 is modeled as containing 4096 lines in a 4-way set-associative manner. Thus, each memory unit 50 can have at most 256 lines present in any one processor 16 cache at any given point in time because each memory unit 50 maps 1/16 of the global memory Given that there are sixteen processors 16 in the computer system 60, the directory 66 for each memory unit 50 need not exceed 4096 processor-line pairs.

Figure 1B:
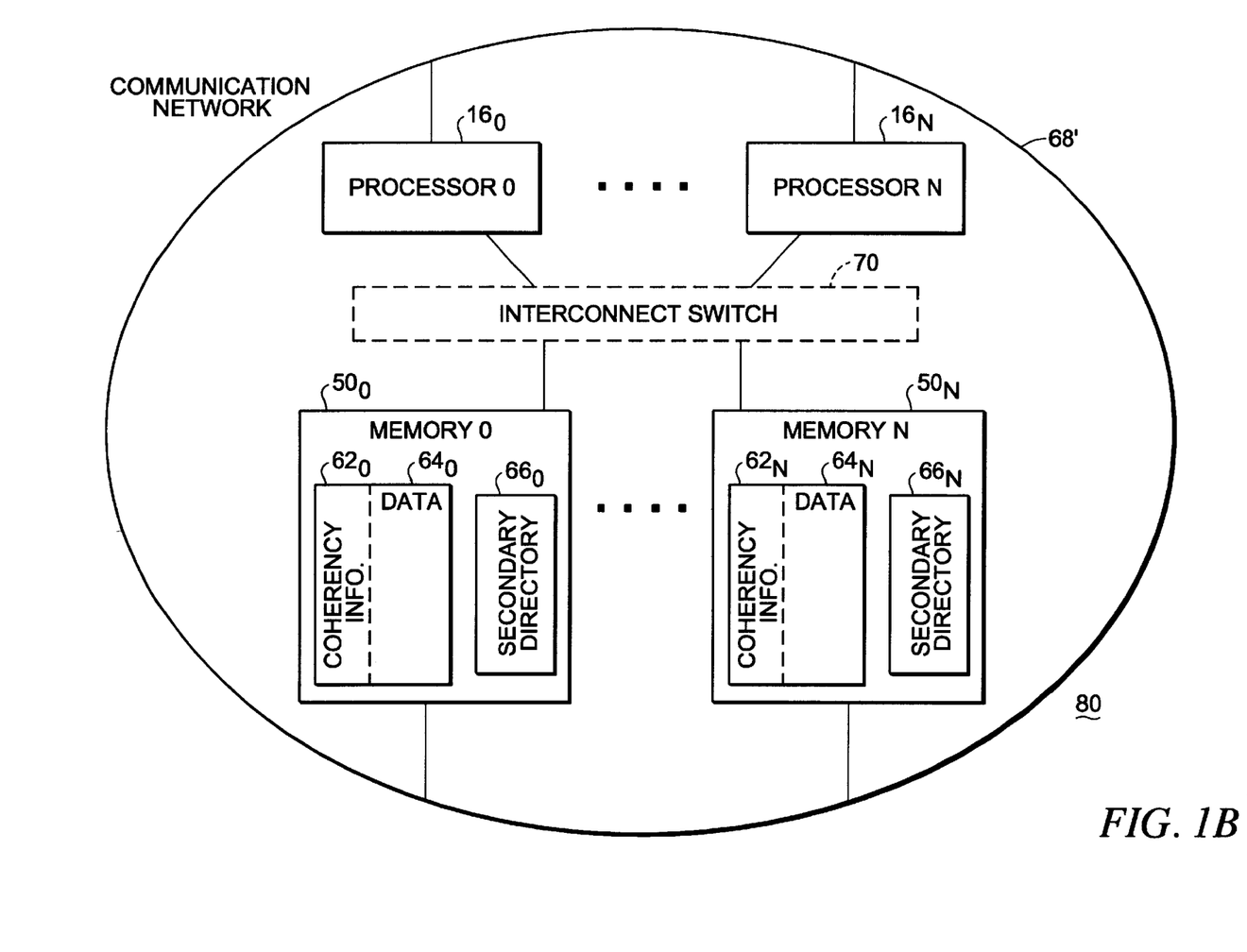
FIG. 1B is a functional block diagram of an alternative embodiment of a multi-processor computer system implementing the cache coherency technique of the present invention wherein the cache communication network transmits the cache coherency commands between the processors and memory utilizing a Sebring ring interconnect strategy.
Figure 3:
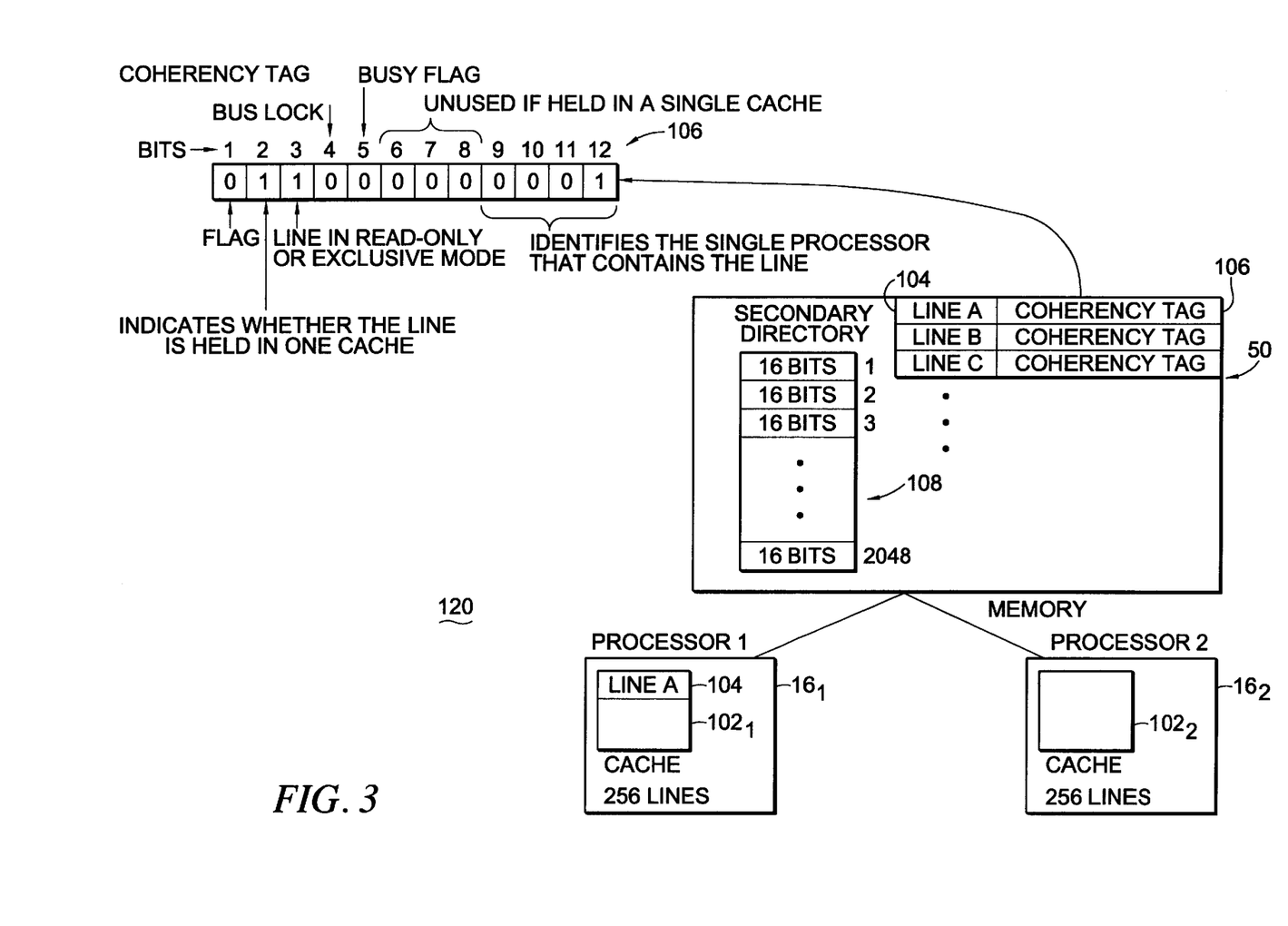
FIG. 3 is an additional exemplary illustration of the multi-processor computer system of FIG. 2 wherein a single processor cache contains a given line of memory data.

With reference additionally now to FIG. 1B, another exemplary computer system 80 architecture is shown wherein the cache communication network $68^1$ is implemented using a Sebring ring interconnect. Structure corresponding to that previously described with respect to FIG. 3 is like numbered and the foregoing description thereof shall suffice herefor.

The cache communication network $68^1$ provides a medium in which cache coherency commands can be transmitted between the memory 50 and the processors 16. By using the ring as designed, shared reads through main data paths are not delayed. This provides system performance similar to that which would be the case with no cache coherency checking. This ring also provides a high data bandwidth for cache coherency commands to be transferred.

In the computer system 80, the cache communication network $68^1$ transmits the cache coherency commands between the processors 16 and memory 50 while data transfers between the processors 16 and memory 50 are transmitted using the interconnect switch 70. The computer system 80, utilizing a Sebring ring interconnect provides significant benefits in terms of superior bandwidth, scalability, ease of use, and relatively low cost implementation.

Figure 2:
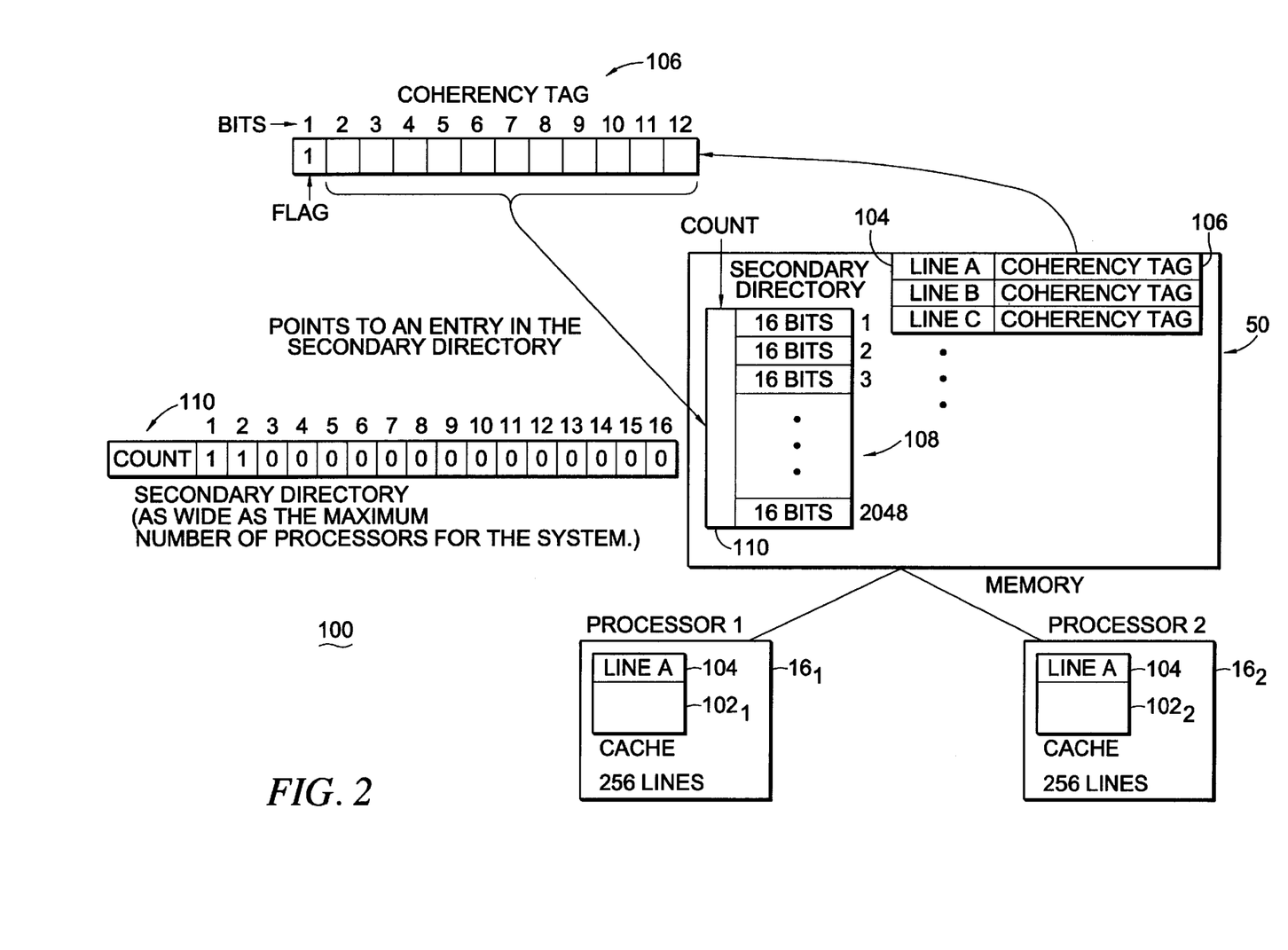
FIG. 2 is an exemplary illustration of the multi-processor computer system of the preceding FIGURES wherein two processor caches contain the same line of memory data.

With reference additionally now to FIG. 2 a portion 100 of the multi-processor computer system of the preceding figures is shown to illustrate the cache coherency technique of the present invention in those circumstances wherein two processor caches contain the same line of memory data. As shown, each of the two processors $16_1$, $16_2$ illustrated include an associated cache $102_1$, and $102_2$ each including the same memory line ("Line A") 104. This same memory line 104 is also maintained in the computer system main memory 50 and has with it an associated coherency tag 106. The memory 50 also includes a secondary directory 108 comprising, in the exemplary implementation shown, 2048 sixteen bit entries with a corresponding count 110.

The coherency tag 106 of each memory line 104 may be twelve bits in length with the first (or any other bit) constituting a "flag" and the remaining bits serving as a pointer to a particular entry in the secondary directory 108. The secondary directory 108 is as wide as the maximum number of processors 16 for the computer system, which in the example described, is sixteen.

In operation, associated with each line in memory 50 are twelve bits of additional storage denominated a "coherency tag" 106 which is used for implementation of the cache coherency technique of the present invention. If the flag (in this case, bit 1) is set, then two processor caches 102 contain the same memory line 104 (Line A) and thus, the line 104 is allocated in "read-only mode". In this case, the lower 11 bits of the coherency tag 106 point to an entry in the secondary directory 108.

Each set bit in the mask in the secondary directory 108 corresponds to a processor 16 holding the memory line 104. Thus, each secondary directory 108 entry contains sixteen bits (one bit for each processor 16 in this example). Because such an entry is required only when at least two processors 16 hold the line 104, the secondary directory 108 needs to contain only 2048 entries.

In addition, a count 110 of the number of set processors 16 holding the line 104 may also be provided. This count 110 may be kept in an array parallel to the secondary directory 108 or, alternatively, if space is available, the count can be kept in the coherency tag 106.

Figure 5:
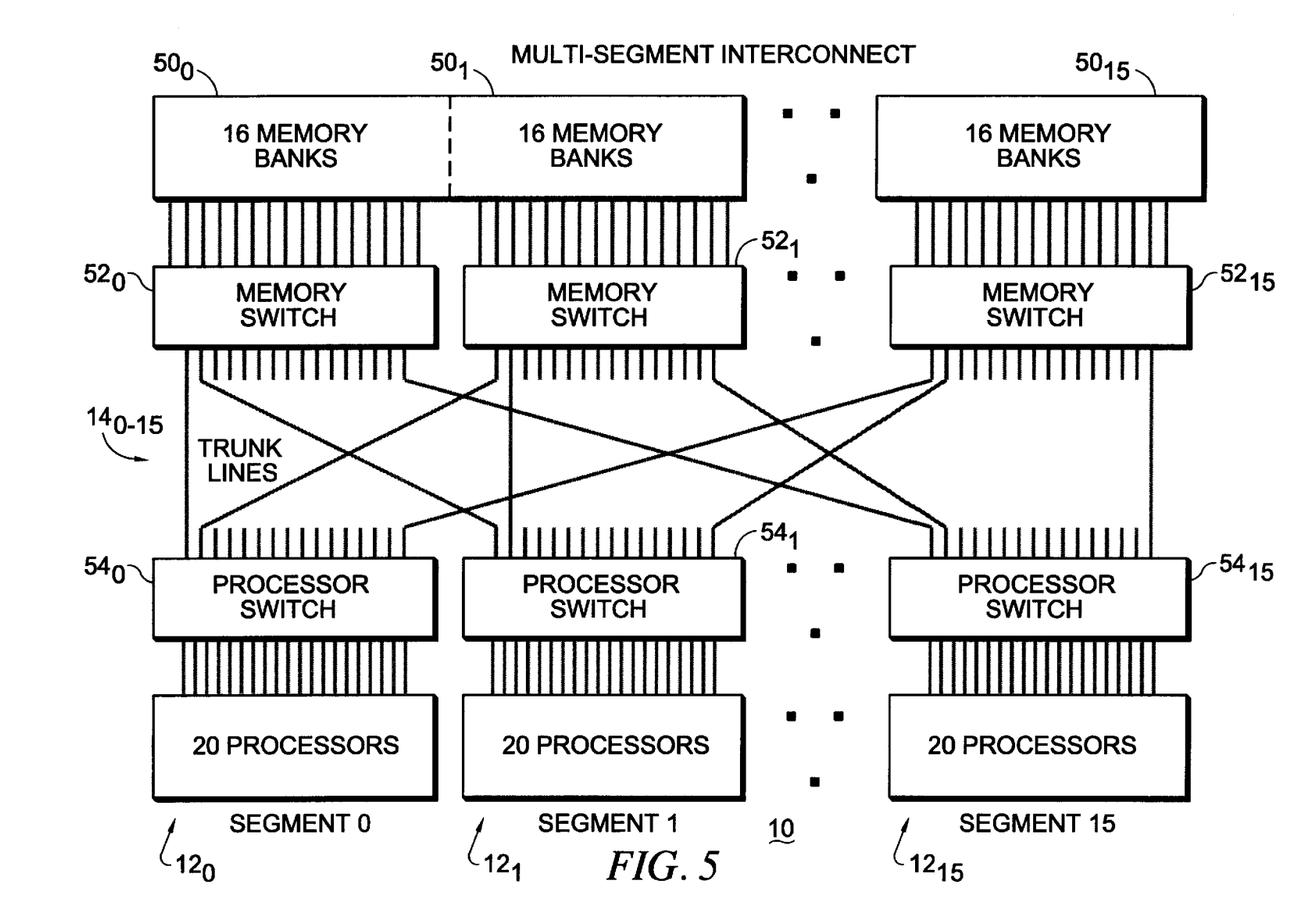
FIG. 5 is a simplified functional block diagram for the interconnect strategy for the computer system of FIGS. 4A and 4B allowing a total of three hundred twenty processors to access any of the two hundred fifty six memory banks comprising a shared memory resource (or main memory).

With reference additionally now to FIG. 3, a corresponding portion 120 of the multi-processor computer system of FIG. 2 is shown to illustrate the situation wherein only a single processor 16 cache $102_1$, contains a given memory line 104 (Line A) of memory data and, for example, cache $102_2$ does not contain Line A. In this figure, like structure to that previously described and shown with respect to FIG. 5 is like numbered and the foregoing description thereof shall suffice herefor.

In this instance, the coherency tag 106 includes a "0" in the bit 1 "flag" position as well as a "1" in both the bit 2 and bit 3 positions. A "1" in the bit 2 position may be used to indicate whether the memory line is held in one of the processor 16 caches 102 while a "1" in the bit 3 position indicates whether the line is in either a "read-only" or "exclusive" mode. Bits 4 and 5 may correspond to a "bus lock" and "busy flag" indication. Bits 6 through 8 inclusive are unused if the memory line 104 is held in only a single cache 102 while bits 9 through 12 inclusive identify the single processor 16 that contains the memory line 104, in this exemplary illustration, processor $16_1$ (bits 9–12= "0001").

In this illustration, if the flag (i.e. the first bit) is not set, the second bit indicates whether the line 104 is held in exactly one cache 102 or not. If the line is held in a cache 102, the third bit is used to specify whether the line is held by the processor 16 in "read-only" or "exclusive" mode. Another four bits are used to identify the processor 16 that holds the line 104. Thus, the state of a line 104 can be fully described using the coherency tag 106 and the secondary directory 108 and no search needs to be made other than the lookup of the coherency tag 106 and possibly the secondary directory 108 entry.

In the embodiment of the present invention illustrated and described, the coherency tag is a tuple:

<sde, active, exclusive, procid, addr>

Where:

| | |
|---|---|
| sde flag | indicates that an active secondary directory entry is in use |
| active | indicates that the line is active in one cache |
| exclusive | boolean that shows the ownership state of the line |
| procid | identifies a single processor that holds the line |
| addr | identifies the address of a secondary directory entry, if allocated |

Although a particular implementation of the cache coherency technique of the present invention has been shown and described in detail, many ways of storing and reorganizing this information may be utilized instead. In any reasonable implementation however, the coherency tag 106 is much smaller than a full directory entry in the case of large systems. This coherency tag 106 can be used to point to a directory entry if required and can be used for the full coherency information if the memory line 104 is located in at most one cache 102. In addition, as will be discussed more fully hereinafter, other information can be stored in the coherency tag 106 when the line 104 is in transition or held in at most one cache 102.

Extensions to the coherency tag 106 may be useful in those transactions in which one processor 16 requests exclusive access to a memory line 104 shared by more than one processor 16 and other transactions requiring invalidation operations. In this case, the data for the request can be returned across the interconnect switch 70 (FIGS. 3 and 4) immediately, but the processor 16 must be prevented from proceeding until the memory line 104 is removed from all caches 102 holding that memory line 104. The coherency tag 106 as described above can be augmented with a busy flag (i.e. bit 5) so that any request for the line 104 can be told to wait, without requiring a comparison against a list of lines being processed. When the invalidations have all been received, the new coherency tag 106 can be written and the memory line 104 moved out of the busy state.

Other uses of the coherency tag 106 are possible and quite advantageous. For example, multi-processor computer systems require synchronization primitives. The Intel Deschutes™ processor 16 architecture implements a "bus lock" capability which allows a processor 16 to obtain exclusive access to memory 50 in order to perform a sequence of read and write operations in an atomic fashion. In a large network-based system, implementing such a lock would be difficult and costly in performance. The bus lock capability is used primarily to read, test and then optionally modify one memory line or two contiguous memory lines. To simulate the bus lock, a bit in the coherency tag 106 (i.e. bit 4) can be used as a "flag" for a locked line. Once the lines for an atomic operation are read and locked, the processor 16 can test the values, issue the write operations and then release the lock. Because Intel locking primitives touch at most two lines, (and those two lines must be contiguous) no "deadlock" or "livelock" condition is possible in a practical program.

As previously described, most prior schemes which have been used to perform cache coherency do not lend themselves towards large multi-processor computer system architectures. The cache coherency technique of the present invention overcomes these limitations. The technique of the present invention uses a directory approach which creates a listing of processor caches that contain the line of memory.

In the specific embodiment of the present invention disclosed herein, it is assumed that a total store order is desired and that the cache coherency system provides sufficient control of the processor to allow modeling of the cache contents. Many other methods of accomplishing this are possible and the technique disclosed is applicable to all of them.

Figures 4, 4A:
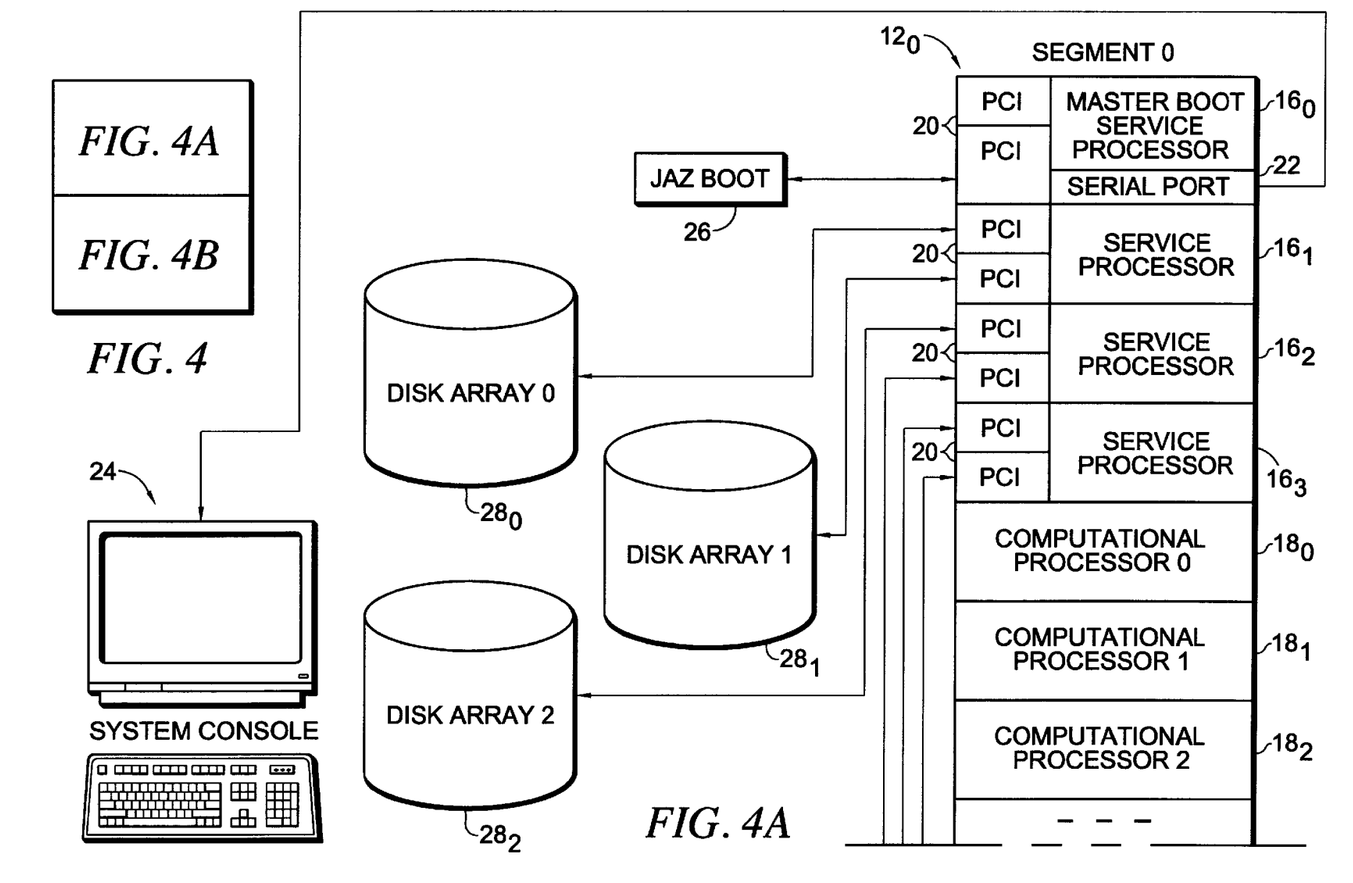
FIGS. 4A and 4B are a functional block system overview illustrating a computer system in accordance with an embodiment of the present invention comprising between 1 and 16 segments coupled together by a like number of trunk lines, each segment containing a number of computational and service processors in addition to memory and a crossbar switch assembly.
Figure 4B:
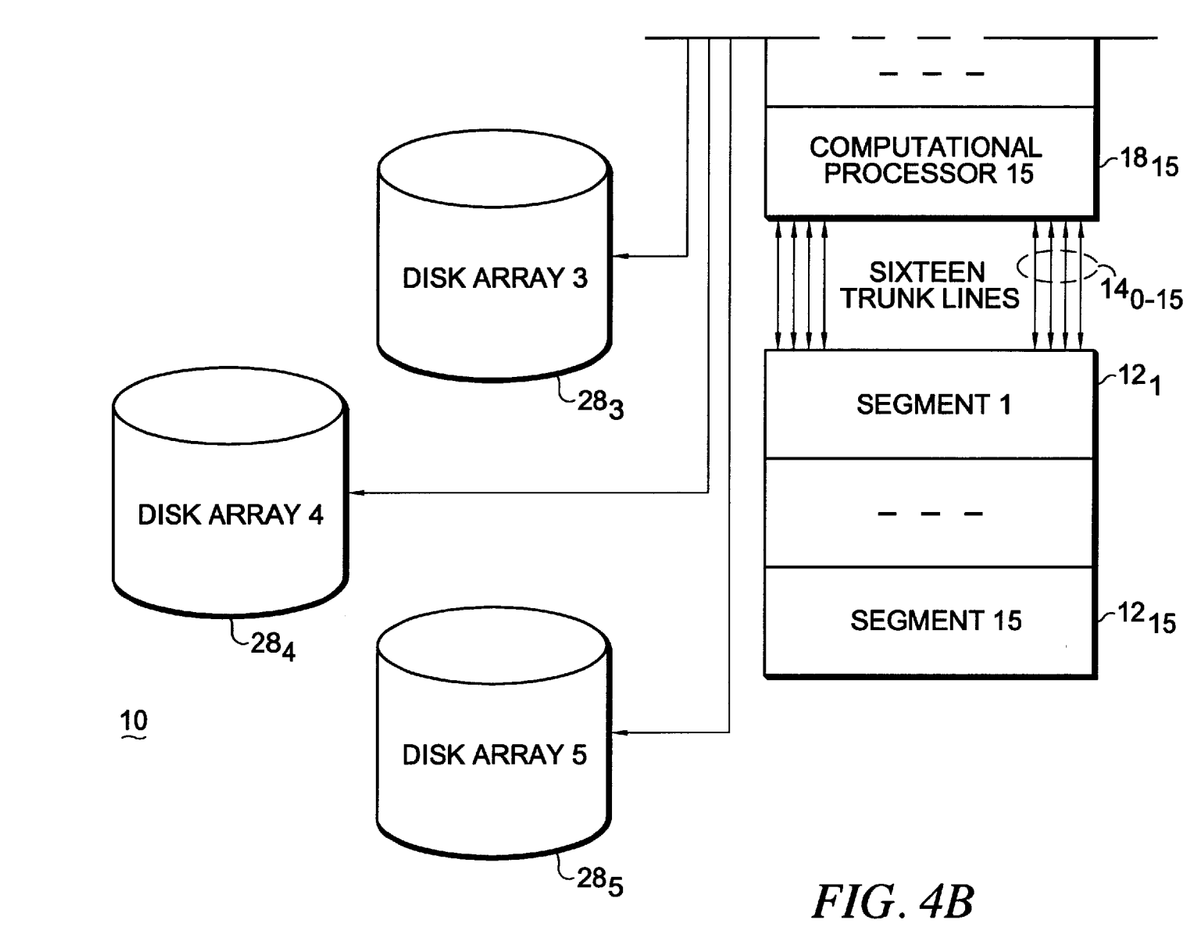

With reference additionally now to FIGS. 4A and 4B, a symmetric multi-processing computer system 10 in accordance with the present invention is shown. The exemplary computer system 10 comprises, in pertinent part, any number of interconnected segments $12_0$ through $12_{15}$, although the principles of the present invention are likewise applicable to any scalable system having large numbers of processors. The various segments $12_0$ through $12_{15}$ are coupled through a number of trunk lines $14_0$ through $14_{15}$ as will be more fully described hereinafter.

Each of the segments 12 comprises a number of functionally differentiated processing elements in the form of service processors $16_0$ through $16_3$ (service processor $16_0$ functions additionally as a master boot device) and computational processors $18_0$ through $18_{15}$. The service processors 16 are coupled to a number of peripheral component interconnect ("PCI") interface modules 20, and in the embodiment shown, each service processor is coupled to two such modules 20 to enable the service processors 16 to carry out all of the I/O functionality of the segment 12.

The service processor 16 further includes a serial interface 22 for coupling a system console 24 to at least one of the segments 12 of the computer system 10. The system console 24 is operational for enabling a user of the computer system 10 to download boot information to the computer system 10, configure devices, monitor status, and perform diagnostic functions. Regardless of how many segments 12 are configured in the computer system 10, only one system console 24 is required.

The boot device 26 (for example, a JAZ® removable disk computer mass storage device available from Iomega Corporation, Roy UT)is also coupled to the master boot service processor $16_0$ through one of the PCI modules 20. The PCI modules 20 coupled to service processors $16_1$ through $16_3$ are utilized to couple the segment 12 to all other peripheral devices such as, for example, disk arrays $28_0$ through $28_5$, any one or more of which may be replaced by, for example, an Ethernet connection.

The computer system 10 comprises sophisticated hardware and building blocks which are commodity based, with some enhancements to accommodate the uniqueness of high-performance computing ("HPC"). On the hardware side, the base unit for the computer system 10 is a segment 12. Each segment 12 contains computation and service processor 18, 16 elements, memory, power supplies, and a crossbar switch assembly. The computer system 10 is "scalable" in that an end user can configure a system that consists of from 1 to 16 interconnected segments 12. Each segment 12 contains 20 total processors: sixteen computational processors 18 and four service processors 16. In a preferred embodiment, the computational processors 18 may reside on an individual assembly that contains four processors (e.g. the Deschutes™ microprocessor) and twelve interface chips (i.e. three per computational processor 18). Each computational processor 18 has an internal processor clock rate greater than 300 MHz and a system clock speed greater than 100 MHz, and the interface chips provide the connection between the computational processors 18 and the memory switches that connect to memory as will be described and shown in greater detail hereafter.

The service processors 16 may be contained on a service processor assembly, which is responsible for all input and output for the computer system 10. Each of the service processor assemblies contain a processor (the same type as the computational processor 18), three interface chips, a 128 Mbyte I/O buffer, and two bi-directional PCI buses. Each PCI bus has a single connector. All I/O ports have DMA capability with equal priority to processors. The PCI modules 20 serve dual purposes, depending upon which service processor 16 with which they are used. The PCI connectors on the master boot service processor $16_0$ are used to connect to the boot device 26. The serial port 22 is connected to the system console 24. The PCI modules 20 on the regular service processors $16_1$ through $163$ are used for all other peripherals. Some of the supported PCI-based interconnects include small computer systems interface ("SCSI"), fiber distributed data interface ("FDDI"), high performance parallel interface ("HIPPI") and others. Each PCI bus has a corresponding commodity-based host adapter.

The separation of service functions from computing functions allows for concurrent execution of numeric processing and the servicing of operating system duties and external peripherals as is disclosed in greater detail in the aforementioned patent applications.

With reference additionally now to FIG. 5, the interconnect strategy for the computer system 10 of FIGS. 1A and 1B is shown in greater detail in an implementation employing sixteen segments $12_0$ through $12_{15}$ interconnected by means of sixteen trunk lines $14_0$ through $14_{15}$. As shown, a number of memory banks $50_0$ through $50_{15}$, each allocated to a respective one of the computational processors $18_0$ through $18_{15}$ (resulting in sixteen memory banks 50 per segment 12 and two hundred fifty six memory banks 50 in total for a sixteen segment 12 computer system 10) form a portion of the computer system 10 and are respectively coupled to the trunk lines $14_0$ through $14_{15}$ through a like number of memory switches $52_0$ through $52_{15}$. The memory utilized in the memory banks $50_0$ through $50_{15}$ may be synchronous static random access memory ("SSRAM") or other suitable high speed memory devices. Also as shown, each of the segments $12_0$ through $12_{15}$ includes, for example, twenty processors (four service processors $16_0$ through $16_3$ and sixteen computational processors $18_0$ through $18_{15}$) coupled to the trunk lines $14_0$ through $14_{15}$ through a corresponding one of a like number of processor switches $54_0$ through $54_{15}$.

Each segment 12 interconnects to all other segments 12 through the crossbar switch. The computer system 10 crossbar switch technology enables segments 12 to have uniform memory access times across segment boundaries, as well as within the individual segment 12. It also enables the computer system 10 to employ a single memory access protocol for all the memory in the system. The crossbar switch may utilize high-speed Field Programmable Gate Arrays ("FPGAs")to provide interconnect paths between memory and the processors, regardless of where the processors and memory are physically located. This crossbar switch interconnects every segment 12 and enables the processors and memory located in different segments 12 to communicate with a uniform latency. In a preferred embodiment, each crossbar switch has a 1 clock latency per tier, which includes reconfiguration time. For a sixteen segment 12 computer system 10 utilizing three hundred and twenty processors 16, 18 only two crossbar tiers are required.

As mentioned previously, the computer system 10 may preferably utilize SSRAM for the memory banks 50 since it presents a component cycle time of 6 nanoseconds. Each memory bank 50 supports from 64 to 256 Mbytes of memory. Each computational processor 18 supports one memory bank 50, with each memory bank 50 being 256 bits wide, plus 32 parity bits for a total width of 288 bits. In addition, the memory bank 50 size may be designed to match the cache line size, resulting in a single bank access for a full cache line. Read and write memory error correction may be provided by completing parity checks on address and data packets.

The parity check for address packets may be the same for both read and write functions wherein new and old parity bits are compared to determine whether or not the memory read or write should continue or abort. When a memory "write" occurs, a parity check may be done on each of the data packets arriving in memory. Each of these data packets has an 8-bit parity code appended to it. As the data packet arrives in memory, a new 8-bit parity code is generated for the data packet and the old and new parity codes are compared. The comparison results in one of two types of codes: single bit error ("SBE") or double-bit or multi-bit error ("DBE"). The single-bit error may be corrected on the data packet before it is entered in memory. In the case of a double-bit or multi-bit error, the data packet is not written to memory, but is reported back to the processor, which retries the data packet reference. When a memory "read" occurs, each of the data packets read from memory generates an 8-bit parity code. This parity code is forwarded with the data to the processor. The processor performs single error correction and double error detection ("SECDED") on each data packet.

While there have been described above the principles of the present invention in conjunction with specific multi-processor computer system architectures, directory structures and coherency tag contents it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A multi-processor computer system comprising:
    a plurality of processors, each of said plurality of processors having an associated data cache;
    a main memory; and
    a communication network bidirectionally coupling said plurality of processors with said main memory to enable communication of data therebetween,
    wherein said main memory comprises:
        at least one directory having a number of entries therein, each of said entries containing an associated bitmask comprising a bit location for each of said plurality of processors in said computer; and
        a coherency tag comprising a number of bit locations associated with each memory line;
        wherein at least a portion of said bit locations in said coherency tag point to a location in said at least one directory, said location indicating which of said associated data caches of said plurality of processors hold said given memory line.

2. The multi-processor computer system of claim 1 wherein said communication network comprises a Sebring ring.

3. The multi-processor computer system of claim 1 wherein said main memory comprises a plurality of memory units.

4. The multi-processor computer system of claim 1 wherein said coherency tag comprises a flag bit having first and second states thereof, said first state being indicative of two of said associated data caches of said plurality of processors including a given memory line in said main memory.

5. The multi-processor computer system of claim 1 further comprising a count indicative of how many of said associated data caches of said plurality of processors hold said given memory line.

6. The multi-processor computer system of claim 4 wherein when said flag bit is in said second state thereof, a portion of said bit locations in said coherency tag are indicative of a single one of said associated data caches of said plurality of processors contains said given memory line.

7. The multi-processor computer system of claim 6 wherein said coherency tag further comprises at least one of said bit locations indicative of whether said given memory line is held in at least one of said associated data caches of said plurality of processors.

8. The multi-processor computer system of claim 6 wherein said coherency tag further comprises at least one of said bit locations indicative of whether said given memory line is in read-only or exclusive mode.

9. The multi-processor computer system of claim 6 wherein said coherency tag further comprises at least one of said bit locations indicative of a bus lock condition.

10. The multi-processor computer system of claim 6 wherein said coherency tag further comprises at least one of said bit locations indicative of a busy condition.

11. The multi-processor system of claim 1, wherein said bitmask further comprises at least two bit locations for at least two of said plurality of processors in said computer system.

12. A method for maintaining cache coherency in a multi-processor computer system including a main memory wherein each of a plurality of processors has an associated data cache, said method comprising the steps of:

providing a communication network coupling said plurality of processors to said main memory;

also providing at least one directory in said main memory having a number of entries therein;

designating a bit location in said at least one directory for each of said plurality of processors in said computer system;

attaching a coherency tag to each memory line in said main memory;

utilizing at least a portion of said bit locations in said coherency tag to point to a location in said at least one directory; and indicating which of said associated data caches of said plurality of processors hold said given memory line based on said location in said at least one directory.

13. The method of claim 12 wherein said step of providing is carried out by means of a Sebring ring.

14. The method of claim 12 wherein said step of attaching is carried out by means of a number of bit locations associated with each memory line.

15. The method of claim 12 further comprising the steps of:

designating a flag bit in said coherency tag having first and second states thereof; and utilizing said flag bit to indicate that two of said data caches associated with said plurality of processors include a given memory line in said main memory.

16. The method of claim 12 further comprising the step of:

maintaining a count indicative of how many of said associated data caches of said plurality of processors hold said given memory line.

17. The method of claim 15 further comprising the steps of:

alternatively utilizing said flag bit to indicate that a single one of said associated data caches of said plurality of processors holds said given memory line; and indicating which of said associated data caches of said plurality of processors holds said given memory line.

18. The method of claim 17 further comprising the step of:

designating at least one of said bit locations in said coherency tag as indicative of whether said given memory line is held in at least one of said associated data caches of said plurality of processors.

19. The method of claim 17 further comprising the step of:

designating at least one of said bit locations in said coherency tag as indicative of whether said given memory line is in read-only or exclusive mode.

20. The method of claim 17 further comprising the step of:

designating at least one of said bit locations in said coherency tag as indicative of a bus lock condition.

21. The method of claim 17 further comprising the step of:

designating at least one of said bit locations in said coherency tag as indicative of a busy condition.

22. The method of claim 12, wherein at least two of said associated data caches of said plurality of processors hold said given memory line.

* * * * *